April 12, 1932.  W. A. FLUMERFELT  1,853,122
JOINT
Filed April 26, 1930
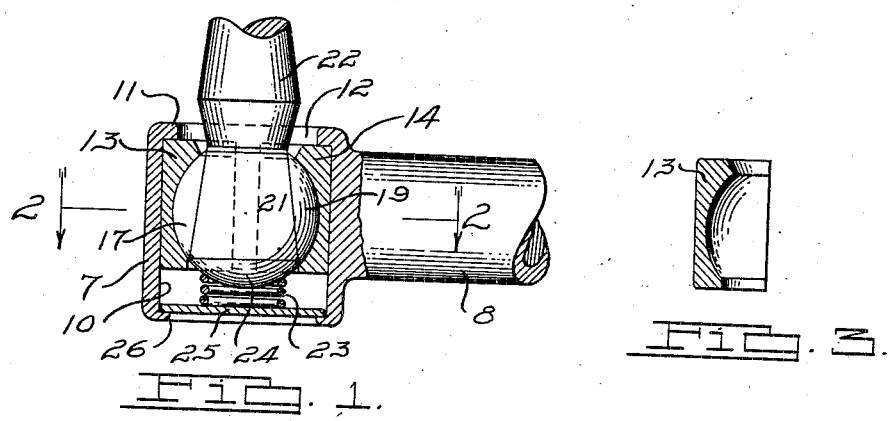
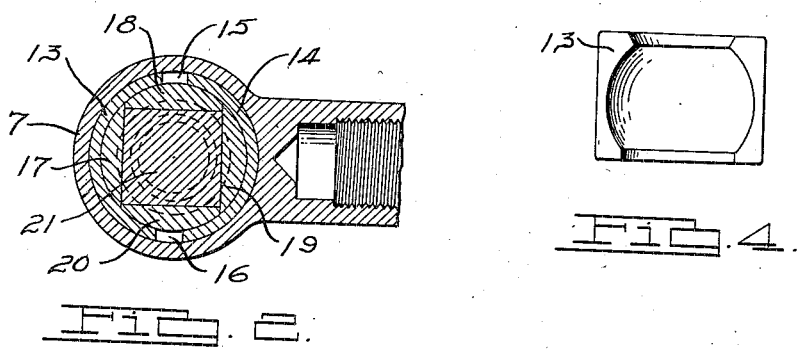
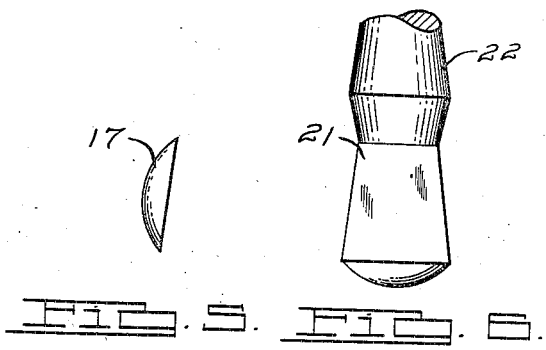
INVENTOR
William A. Flumerfelt.
BY
Harness, Dickey, Pierce & Hann,
ATTORNEYS.

Patented Apr. 12, 1932

1,853,122

UNITED STATES PATENT OFFICE

WILLIAM A. FLUMERFELT, OF COLUMBUS, OHIO, ASSIGNOR TO THE COLUMBUS AUTO PARTS COMPANY, A CORPORATION OF OHIO

JOINT

Application filed April 26, 1930. Serial No. 447,514.

This invention relates to joints particularly of the ball and socket type.

The main objects of this invention are to provide an automatically adjustable ball and socket joint construction particularly useful for the steering rod and tie bar connections of an automobile, to provide a construction in which the axial center of the ball and shank member will not be displaced when adjustment occurs due to wear in the parts, and to provide a construction of simple character which is strong and durable and easily assembled.

An illustrative embodiment of this invention is shown in the accompanying drawings, in which Fig. 1 is a view partly in vertical medial section and partly in elevation of a construction typifying my improved invention.

Fig. 2 is a sectional view of the same taken on the line 2—2 of Fig. 1 looking in the direction indicated by the arrows.

Fig. 3 is a sectional view of one of the socket members used in this construction.

Fig. 4 is a face view of the same looking in the direction indicated by the arrow shown in Fig. 3.

Fig. 5 is a view in elevation of one of the spherical segments used in my construction.

Fig. 6 is a view in elevation of the inner wedge member which forms the body of the ball portion of this improved iojnt.

In the construction shown in the drawings, an outer housing member 7 of substantially cylindrical form is provided with a radially extending hollow shank 8 integrally formed thereon which is interiorly threaded at 9 to receive a tie-rod or the like. The housing 7 has an opening 10 of uniform diameter extending therethrough with the axis thereof perpendicular to the axis of the shank 8.

The upper end of the housing 7 is provided with an inturned flange 11 which forms an annular opening 12 of smaller diameter than the opening 10 in the housing 7.

A pair of substantially semi-cylindrical members 13 and 14 are fitted within the opening 10 in abutting relationship against the flange 11 and in spaced relationship to each other as shown at 15 and 16 in Fig. 2 of the drawings.

The inner faces of the members 13 and 14 are provided with concave sockets, concentrically formed with respect to their outer sides and to the housing enclosing the members, said socket faces being formed on a uniform radius to snugly embrace an inner ball member.

A plurality of spherical segments 17, 18, 19 and 20 are fitted in the sockets of the members 13 and 14 and disposed uniformly about the four sides of an inner frusto-pyramidal wedge member 21 which has an integrally formed shank 22 extending through the flanged opening 12. The wedge member 21 is tapered upwardly toward its shank 22 and bears against the plane faces of the spherical segment members 17, 18, 19 and 20 so that said segment members with the wedge member form a substantially spherical ball.

Means are provided for moving the segment members 17, 18, 19 and 20 outwardly against the socket members 13 and 14 and comprises a helical compression spring 23 interposed between and bearing against the lower end 24 of the wedge 21 and the upper or inner face of a closure plate 25 retained in the opening 10 by a spun-in or crimped flange 26. The spring 22 constantly urges the wedge upwardly in an axial direction toward the flanged opening of the housing.

In the operation of this joint construction, the parts are assembled as shown in Figs. 1 and 2 of the drawings with the spring 23 under compression. As wear in the parts occurs, the wedge 21 travels upwardly in an axial direction and due to its tapered outer surfaces moves the spherical segment members 17, 18, 19 and 20 outwardly against the inner walls of the opening 10 and against the inturned flange 11.

Constant automatic adjustment to compensate for wear in the parts is thus secured. As the movement of the wedge member 21 is in an axial direction and the segment members are disposed on all four sides thereof, the axis of the wedge 21 and shank 22 will not be displaced with respect to the housing 7, but will remain co-axial with the opening 10 in said housing.

Although but one specific embodiment of this invention has been herein shown and described, it will be understood that numerous details of the construction shown may be altered or omitted without departing from the spirit of this invention as defined by the following claim.

I claim:

A ball and socket joint construction comprising an outer housing member having an opening therethrough, an inturned flange at one end of said opening, a pair of socket members fitted in said opening in abutting relation against said flange, an inner wedge member of frusto-pyramidal shape positioned within said socket members, spherical segment members embraced by said socket members with their plane faces bearing against the sides of said wedge member, and spring means for urging said wedge member toward the flange bound opening for spreading the segment members outwardly against the socket members.

WILLIAM A. FLUMERFELT.